United States Patent
Kim et al.

(10) Patent No.: US 9,566,865 B2
(45) Date of Patent: Feb. 14, 2017

(54) METHOD AND SYSTEM FOR DIAGNOSING CHARGING STATE

(71) Applicants: Hyundai Motor Company, Seoul (KR); Kia Motors Corporation, Seoul (KR)

(72) Inventors: Seung-Bum Kim, Gyeonggi-do (KR); Bon Chang Koo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 179 days.

(21) Appl. No.: 14/561,436

(22) Filed: Dec. 5, 2014

(65) Prior Publication Data

US 2016/0031324 A1 Feb. 4, 2016

(30) Foreign Application Priority Data

Aug. 1, 2014 (KR) ........................ 10-2014-0099168

(51) Int. Cl.
G06F 11/30 (2006.01)
G06F 7/00 (2006.01)
(Continued)

(52) U.S. Cl.
CPC .......... B60L 3/0046 (2013.01); B60L 11/1861 (2013.01); H02J 7/0047 (2013.01);
(Continued)

(58) Field of Classification Search
USPC ..... 701/22, 109, 137, 31.4, 34.4, 32.7, 30.5; 320/107, 109, 112; 903/903; 702/58
See application file for complete search history.

(56) References Cited

U.S. PATENT DOCUMENTS 7,463,959 B2 * 12/2008 Namaky ............... H04L 67/125
701/32.8
8,565,948 B2 * 10/2013 Pudar .................... B60W 40/09
701/22
(Continued)

FOREIGN PATENT DOCUMENTS

CN 104024822 B * 8/2016 .......... F02N 11/0814
JP 2000-206215 A 7/2000
(Continued)

OTHER PUBLICATIONS

A Study on Speech Control Interface for Vehicle On-Board Diagnostic System; Shi-Huang Chen; Yu-Ru Wei; Genetic and Evolutionary Computing (ICGEC), 2010 Fourth International Conference on; Year: 2010; pp. 614-617, DOI: 10.1109/ICGEC.2010.157.*
(Continued)

Primary Examiner — Cuong H Nguyen
(74) Attorney, Agent, or Firm — Mintz Levin Cohn Ferris Glovsky and Popeo, P.C.; Peter F. Corless (57) ABSTRACT

A method for diagnosing charging state may include a diagnostic trouble code generation step of generating a diagnostic trouble code (DTC) when the state for charging a battery from an alternator is abnormal in the state in which the alternator is operating to charge the battery while a vehicle is traveling, and then storing diagnostic trouble code in an ECU (Electronic Control Unit), and a diagnostic trouble code release step of deleting the diagnostic trouble code in the ECU when the state for charging the battery from the alternator is returned to be normal.

16 Claims, 4 Drawing Sheets

(51) Int. Cl.
*G06F 19/00* (2011.01)
*B60L 3/00* (2006.01)
*B60L 11/18* (2006.01)
*H02J 7/00* (2006.01)
*H02J 7/14* (2006.01)

(52) U.S. Cl.
CPC .......... *H02J 7/0052* (2013.01); *H02J 7/1461* (2013.01); *Y02T 10/7005* (2013.01)

(56) References Cited

U.S. PATENT DOCUMENTS

| | | | | |
|---|---|---|---|---|
| 9,047,719 B2* | 6/2015 | Yagi | ................... | F02N 11/0814 |
| 2003/0236601 A1* | 12/2003 | McLeod | ............. | B60L 11/1846 |
| | | | | 701/31.4 |
| 2006/0025897 A1* | 2/2006 | Shostak | ................ | B60C 23/005 |
| | | | | 701/1 |
| 2006/0052918 A1* | 3/2006 | McLeod | ............. | B60L 11/1846 |
| | | | | 701/22 |
| 2008/0294329 A1* | 11/2008 | Noda | ....................... | F01N 9/002 |
| | | | | 701/112 |
| 2010/0179720 A1* | 7/2010 | Lin | ........................ | G07C 5/008 |
| | | | | 701/31.4 |
| 2011/0077828 A1* | 3/2011 | Matsuda | ................. | F02D 17/00 |
| | | | | 701/54 |
| 2011/0131666 A1* | 6/2011 | Tanaka | ................... | G07C 5/008 |
| | | | | 726/30 |
| 2012/0004804 A1* | 1/2012 | Beams | ................ | G01S 5/0027 |
| | | | | 701/32.7 |
| 2014/0035527 A1* | 2/2014 | Hayashigawa | ..... | B60L 11/1818 |
| | | | | 320/109 |
| 2014/0107886 A1* | 4/2014 | Miljkovic | .............. | G07C 5/008 |
| | | | | 701/29.6 |
| 2014/0203777 A1* | 7/2014 | Flack | ....................... | B60L 3/04 |
| | | | | 320/109 |
| 2014/0350775 A1* | 11/2014 | Yagi | ....................... | G07C 5/008 |
| | | | | 701/31.4 |
| 2014/0358359 A1* | 12/2014 | Yagi | .................... | F02N 11/0814 |
| | | | | 701/31.4 |
| 2016/0096438 A1* | 4/2016 | Grimes | ............... | B60L 11/1816 |
| | | | | 320/109 |

FOREIGN PATENT DOCUMENTS

| | | | | |
|---|---|---|---|---|
| JP | 2013-092052 A | | 5/2013 | |
| JP | WO 2013099395 A1 * | | 7/2013 | .......... F02N 11/0814 |
| JP | 2013551511 | * | 5/2015 | .......... F02N 11/0814 |
| KR | 1020040072063 | | 8/2004 | |
| KR | 100461130 | | 12/2004 | |
| KR | 10-0566426 B1 | | 3/2006 | |
| KR | 10-2006-0077589 A | | 7/2006 | |
| KR | 10-2007-0038284 A | | 4/2007 | |

OTHER PUBLICATIONS

Development of an On-Board Diagnostic (OBD) kit for troubleshooting of compliant vehicles; Niazi, M.A.K.; Nayyar, A.; Raza, A.; Awan, A.U.; Ali, M.H.; Rashid, N.; Iqbal, J.; Emerging Technologies (ICET), 2013 IEEE 9th International Conference on Year: 2013; pp. 1-4, DOI: 10.1109/ICET.2013.6743551.*

Battery aware instruction generation for embedded processors; N. Cheung; S. Parameswarant; J. Henkel; Proceedings of the ASP-DAC 2005. Asia and South Pacific Design Automation Conference, 2005; Year: 2005, vol. 1; pp. 553-556 vol. 1, DOI: 10.1109/ASPDAC.2005.1466225.*

* cited by examiner

METHOD AND SYSTEM FOR DIAGNOSING CHARGING STATE

CROSS-REFERENCE TO RELATED APPLICATION

This application claims priority to Korean Patent Application No. 10-2014-0099168, filed on Aug. 1, 2014, the entire contents of which is incorporated herein by reference.

BACKGROUND OF THE INVENTION

Field of the Invention

An exemplary embodiment of the present invention relates to a method and system for diagnosing charging state that diagnoses one of the causes of starting off, and particularly, to the method and system for diagnosing charging state to facilitate an attribution and a maintenance of a starting off when the starting off occurs due to a charging defect, in order to determine whether the starting off is caused by the charging defect or not, by storing the state in which the charging state from the alternator is abnormal in the low battery voltage state as a diagnostic trouble code.

Description of Related Art

In the ECU (Electronic Control Unit) of a vehicle, an abnormal state of each parts of the vehicle is stored as a diagnostic trouble code (DTC; Diagnostic Trouble Code), which is used for checking of the vehicle and repairing.

For example, the diagnostic trouble cause of the vehicle may be readily grasped by checking the diagnostic trouble code via a scanner during maintenance.

However, it was not easy to act the trouble for some defect conditions of the vehicle, because it could not be recorded by the diagnostic trouble code.

As an example, there was a trouble that the case where the charging state from the alternator is not normal in the low battery voltage state, is not stored as a diagnostic trouble code.

As described above, if the charging state from the alternator is not normal in the low battery voltage state, the voltage of the power supplied to each part of the vehicle is lowered to less than the reset voltage of the ECU (Electronic Control Unit) and the various actuators of the vehicle so that the ECU and the actuator did not operate properly, as a result, it could not save it as a diagnostic trouble code.

In addition, as described above, when the battery voltage is low and the charging state from the alternator is defective, the sufficient power to maintain the starting of the vehicle is not supplied so that a starting off sometimes occurs. However, as described above, the state where the battery is low and the charging state from the alternator is defective, is not recorded as a diagnostic trouble code, thereby causing the problem in which the cause of the starting off could not be accurately grasped.

SUMMARY OF THE INVENTION

An embodiment of the present invention is directed to provide a method and system for diagnosing charging state that facilitates an attribution and maintenance of starting off by determining the cause of the starting off when starting off occurs by storing the charging state as a diagnostic trouble code when a charging state from the alternator is abnormal in the low voltage battery while battery is being charged by operating of the alternator in a vehicle.

In addition, other object of the exemplary embodiment of the present invention provides a method and system for diagnosing charging state that deletes the diagnostic trouble code recorded due to the charging state defect when the charging state is returned to normal.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

To achieve the above objective, the method for diagnosing charging state in accordance with the exemplary embodiment of the present invention may include a diagnostic trouble code generation step of generating a diagnostic trouble code (DTC; Diagnostic Trouble Code) when the state for charging a battery from an alternator is abnormal in the state in which the alternator is operating to charge the battery while a vehicle is traveling, and then storing diagnostic trouble code in an ECU, and a diagnostic trouble code release step of deleting the diagnostic trouble code in the ECU when the state for charging the battery from the alternator is returned to be normal.

The diagnostic trouble code generation step may include a diagnostic trouble code generation entry determination step of determining whether the conditions for generating diagnostic trouble code are satisfied by determining the state of the vehicle and the battery, a charging state detection step of detecting the state charged to the battery from the alternator, a charging state defect determination step of determining whether the charging state from the alternator is defective, by comparing an engine driving time, an operating conditions of the alternator, a difference between a target voltage and an output voltage and a current accumulation with each predetermined conditions, and a diagnostic trouble code store step of generating the diagnostic trouble code with the state that the battery is not charged due to a charging state defect from the alternator and storing the diagnostic trouble code in the ECU.

The diagnostic trouble code generation entry determination step may include a diagnostic trouble diagnosis vehicle condition satisfaction determination step of determining whether a running vehicle satisfies the conditions which can generate the diagnostic trouble code based on a charging defect from the alternator, and a battery state determination step of determining whether the charging rate of the battery is lower than a predetermined diagnostic trouble diagnosis entry charging rate.

In the diagnostic trouble diagnosis vehicle condition satisfaction determination step, the battery state determination step is performed when the engine is driving, LIN (Local Interconnect Network) communication is normal and a total running distance of the vehicle is less than a predetermined diagnostic trouble code generation total running distance.

In the battery state determination step, the charging state detection step is performed when the charging rate of the battery is lower than a predetermined diagnostic trouble diagnosis entry charging rate.

The charging state detection step calculates a cumulative amount of current charged from the alternator to the battery, duties of a C terminal of the alternator and a FR terminal of the alternator and an average voltage of the battery.

The charging state defect determination step may include an engine driving time comparison step of comparing whether the engine driving time is greater than the predetermined defect determination engine driving time, an alternator duty comparison step of determining whether the duties of the C terminal of the alternator and the FR terminal of the alternator exist within a predetermined defect determination duty range, a voltage difference comparison step of determining whether the difference between a target output voltage of the alternator and an actual output voltage outputted from the alternator is greater than a predetermined diagnostic trouble determination voltage difference, and a cumulative amount of current comparison step of comparing whether the cumulative amount of current outputted from the alternator is smaller than a predetermined diagnostic trouble determination cumulative current value.

The defect determination engine driving time is set to 1200 sec in the engine driving time comparison step.

The charging state detection step is returned when the engine driving time is not greater than the defect determination engine driving time.

The defect determination duty rage is set to that the duty of the C terminal of the alternator is excess 90% and the duty of the FR terminal of the alternator is less than 50% in the alternator duty comparison step.

The diagnostic trouble determination voltage difference is set to 0.5V in the voltage difference comparison step.

The diagnostic trouble determination cumulative current value is set to −5 Ah in the cumulative amount of current comparison step.

The diagnostic trouble code release step may include a diagnostic trouble code release entry determination step of determining whether the running state of the vehicle and the diagnostic trouble code recorded in the ECU satisfy the conditions to release the diagnostic trouble code concerning the charging defect from the alternator, a current accumulation initiation step of starting to accumulate the amount of the current outputted from the alternator, a charging state good determination step of determining whether the charging state from the alternator is good by comparing the accumulation time of the amount of the current and the cumulative amount of the current with predetermined conditions, a diagnostic trouble code deletion step of deleting the diagnostic trouble code recorded in the ECU, when it is determined that the charging state from the alternator is good.

The diagnostic trouble code release entry determination step may include a diagnostic trouble release vehicle condition satisfaction determination step of determining whether the running state of the vehicle satisfies the conditions that can release diagnostic trouble code, and a diagnostic trouble code comparison step of comparing whether the diagnostic trouble code stored in the ECU is the diagnostic trouble code concerning the charging defect from the alternator, wherein the current accumulation initiation step is performed when the diagnostic trouble code is the diagnostic trouble code regarding the charging defect from the alternator in the diagnostic trouble code comparison step.

In the diagnostic trouble release vehicle condition satisfaction determination step, the diagnostic trouble code comparison step is performed when the engine is driving and the LIN (Local Interconnect Network) communication is normal.

The charging state good determination step may include a current accumulation time satisfaction determination step of comparing whether the accumulation time of the amount of the current outputted from the alternator is greater than a predetermined diagnostic trouble release accumulation time, a cumulative amount of current satisfaction determination step of comparing whether the cumulative amount of current outputted from the alternator is greater than a predetermined diagnostic trouble release cumulative amount of the current.

In the current accumulation time satisfaction determination step, the diagnostic trouble release accumulation time is set to 600 sec.

In the cumulative amount of the current satisfaction determination step, the diagnostic trouble release cumulative amount of the current is set to 2 Ah.

A system for diagnosing the charging state according to the present invention may include a charging state diagnosis unit which diagnoses whether a charging state is diagnostic trouble or not, by diagnosing the voltage, the current, the duty inputted from an alternator which generates and is provided in a vehicle as operated by the driving of an engine and a voltage inputted from a battery charged by the alternator according to the above method for diagnosing charging state described above, a diagnostic trouble code recording unit which generates diagnostic trouble or absence of the charging state in the charging state diagnosis unit as the diagnostic trouble code and records the diagnostic trouble code, and a diagnostic trouble code memory that stores the diagnostic trouble code generated from the diagnostic trouble code recording unit.

The charging state diagnosis unit, the diagnostic trouble code recording unit and the diagnostic trouble code memory may be provided in the ECU (Electronic Control Unit).

In accordance with a method and system for diagnosing charging state according to the present invention having the above configuration, if the charging state is defective in the vehicle, it is stored as a diagnostic trouble code so that it may be identified clearly whether the starting off is caused by the defective charging state mentioned above, or to other causes in the event of the starting off.

In addition, by measuring the output voltage, the current, and the duty for each terminal from the alternator and diagnosing the same, it may be identified whether the charging defect is caused due to the malfunction of the alternator or simply due to fastening between the vehicle side (fuse box) and the output from the alternator, thereby appropriately coping to the malfunction cause. That is, if the malfunction is caused due to simply fastening defect between the vehicle side and the output from the alternator, it is possible to conduct re-fastening of the connecting portion, and if the alternator is defective, it may respond to the charging state defect by exchanging the alternator.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this invention will be thorough and complete, and will fully convey the scope of the present invention to those skilled in the art. Throughout the invention, like reference numerals refer to like parts throughout the various figures and embodiments of the present invention.

Figure 1A:
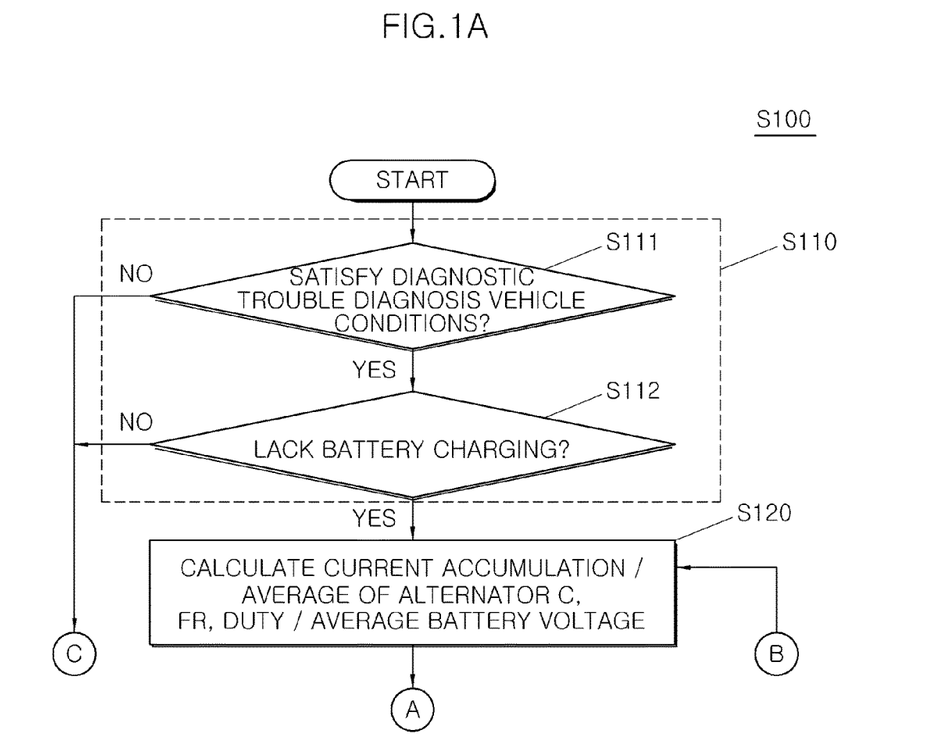
FIG. 1A and FIG. 1B are a flowchart illustrating a diagnostic trouble code generation step in the method for diagnosing charging state in accordance with an exemplary embodiment of the present invention.
Figure 1B:
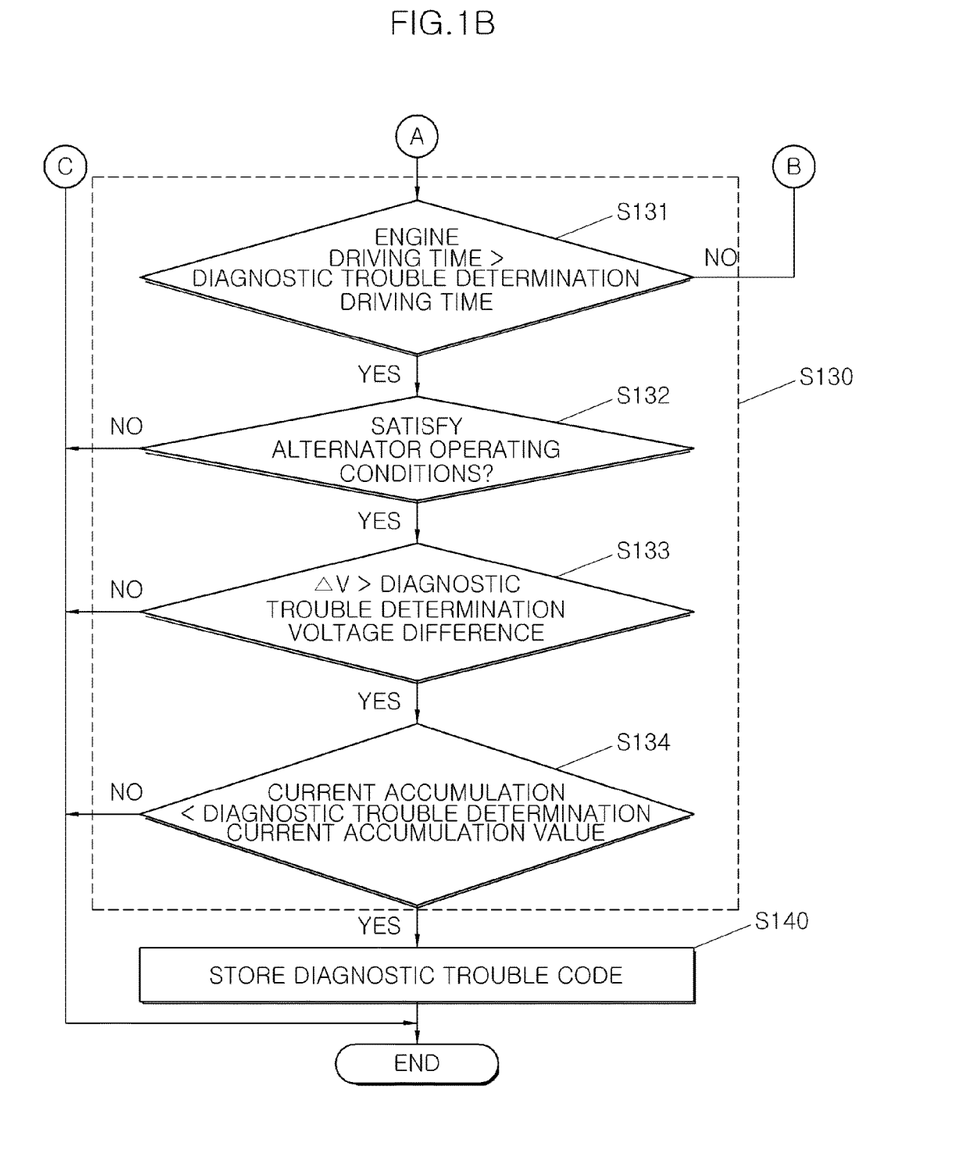
Figure 2:
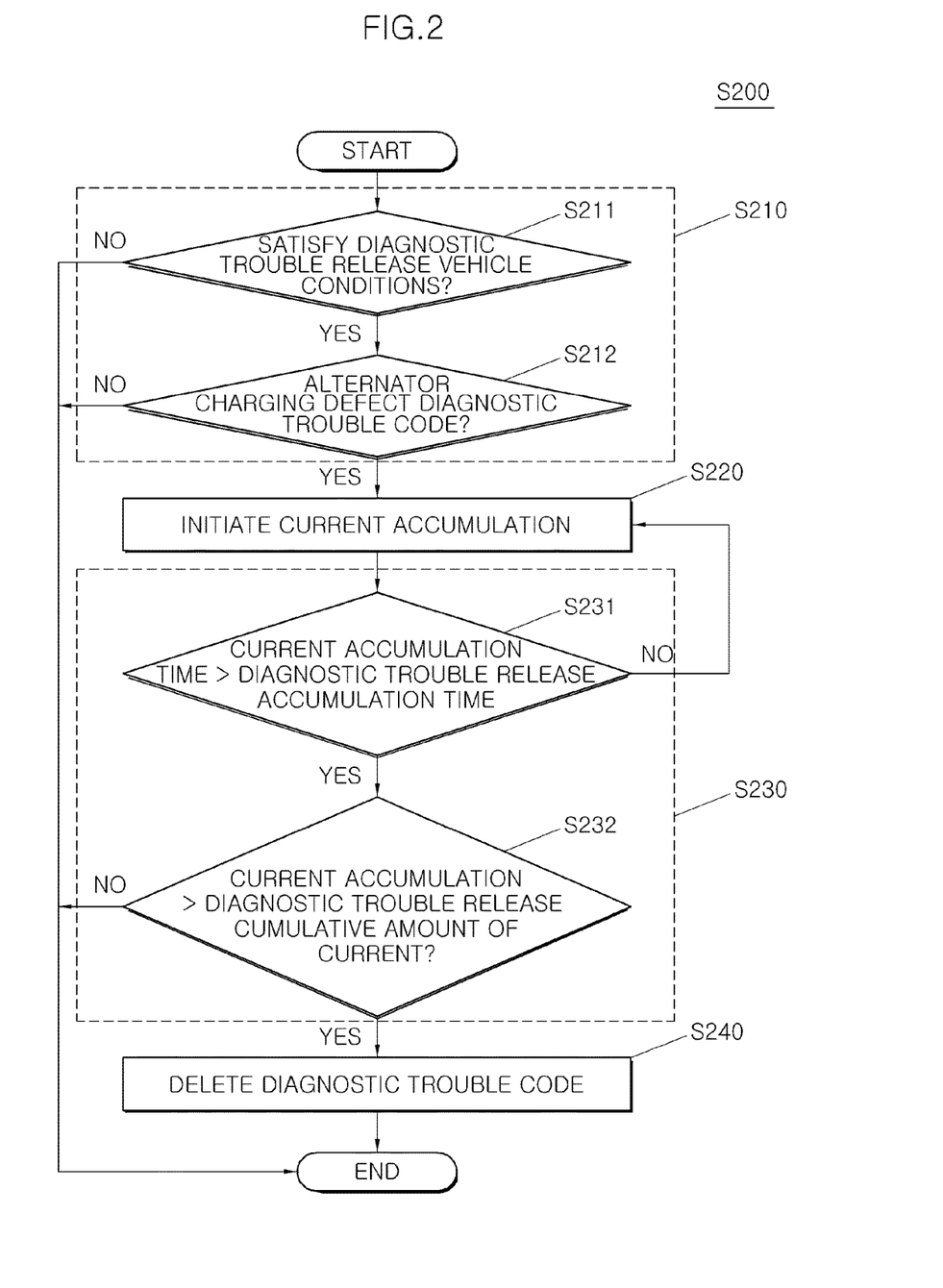
FIG. 2 is a flowchart illustrating a diagnostic trouble code release step in the method for diagnosing charging state in accordance with the exemplary embodiment of the present invention.

A method for diagnosing charging state in accordance with the exemplary embodiment of the present invention may include a diagnostic trouble code generation step (S100) which generates a diagnostic trouble code (DTC; Diagnostic Trouble Code) when the state for charging a battery from an alternator is abnormal in the state in which the alternator is operating to charge the battery while a vehicle is traveling, and then stores it in an ECU (Electronic Control Unit), and a diagnostic trouble code release step (S200) which deletes the diagnostic trouble code in the ECU when the state for charging the battery from the alternator is returned to normal.

As described above, in the method for diagnosing charging state in accordance with the exemplary embodiment of the present invention, during charging the battery from the alternator, when the charging state from the alternator is defective, it is stored as a diagnostic trouble code, and then if the charging state from the alternator is to be in good again, the diagnostic trouble code is deleted.

First, referring for the diagnostic trouble code generation step (S100), the diagnostic trouble code generation step (S100) may include a diagnostic trouble code generation entry determination step (S110) which determines whether the conditions for generating diagnostic trouble code are satisfied by determining the state of the vehicle and the battery 2, a charging state detection step (S120) which detects the state charged from the alternator 1 to the battery 2, a charging state defect determination step (S130) which determines whether the charging state from the alternator 1 is defective, by comparing an driving time of an engine, an operating conditions of the alternator 1, a difference between a target voltage and a output voltage and an current accumulation with each predetermined conditions, a diagnostic trouble code store step (S140) which generates the diagnostic trouble code when the state is that the battery 2 is not charged due to a charging state defect from the alternator 1 and stores the diagnostic trouble code in the ECU.

The diagnostic trouble code generation entry determination step (S110) determines whether a state of vehicle which can generate diagnostic trouble code based on charging defect from the alternator 1 and a charging state of the battery 2 satisfies conditions which can generate diagnostic trouble code due to charging defect from the alternator 1. The diagnostic trouble code generation entry determination step (S110) consists of a diagnostic trouble diagnosis vehicle condition satisfaction determination step (S111) which determines whether a running state of the vehicle satisfies diagnostic trouble code generation entry condition, and a battery state determination step (S112) which determines whether a charging state of the battery 2 satisfies diagnostic trouble code generation entry condition.

The diagnostic trouble diagnosis vehicle satisfaction determination step (S111) determines whether a running vehicle satisfies the conditions which can generate a diagnostic trouble code due to the charging defect from the alternator 1.

In the diagnostic trouble diagnosis vehicle satisfaction determination step (S111), it can be seen to have conditions to generate a diagnostic trouble code due to the charging defect from the alternator 1 when an engine is driving, a LIN (Local Interconnect Network) communication of a vehicle is a normal and a total running distance of the vehicle is less than the predetermined diagnostic trouble code generating total running distance.

Here, the LIN communication is mainly one of the protocols which are used for transmitting data between the ECU and an active actuator.

Meanwhile, as the diagnostic trouble code generating total running distance predetermines by a 1,000 km, the diagnostic trouble diagnosis vehicle condition satisfaction determination step (S111) is performed when a total running distance of a vehicle is less than the diagnostic trouble code generating total running distance, that is, only when the vehicle is in the initial state. Only in the initial state of the vehicle, that is, only when the total running distance of the vehicle is less than the diagnostic trouble code generating total running distance, by performing the diagnostic trouble diagnosis vehicle condition satisfaction determination step (S111), it may be confirmed whether terminal B+ used to charge the actual battery 2 from the alternator 1 is properly fastened to a fuse box of the vehicle. The diagnostic trouble diagnosis vehicle condition satisfaction determination step (S111) is performed only when the total running distance of the vehicle is only in the initial state because it occurs whether the fastening of the B+ terminal is perfect or not in the assemble process of the vehicle.

In the diagnostic trouble diagnosis vehicle condition satisfaction determination step (S111), unless vehicle conditions for diagnostic trouble diagnosis satisfy, that is, when the engine is not running, there is an error in the LIN communication, the total running distance of vehicle is not less than diagnostic trouble code generating total running distance, processes described below are terminated without further performing.

The battery state determination step 112 determines whether the charging state of the battery, that is, SOC (State of Charging) satisfies the conditions for diagnostic trouble code generation entry. As the specific configuration, it is determined whether the charge rate of the battery 2, that is, SOC is less than the predetermined diagnostic trouble diagnosis entry charge rate. Here, the diagnostic trouble diagnosis entry charge rate can be set by 70%. Thus, when the SOC of the battery 2 is lower than 70%, the processes described below for a diagnostic trouble code generation are performed. Otherwise the processes will be terminated.

The charging state detection step (S120) detects the state charged from the alternator 1 to the battery 2. That is, the charging state detection step (S120) uses the current outputted from the alternator 1, the duty value of each terminal and the voltage of the battery 2. Specifically, the charging state detection step (S120) detects the cumulative amount of current outputted from the alternator 2, the duties of the C terminal and the FR terminal from the alternator 1 and the voltage of the battery 2.

Here, the C terminal of the alternator 1 is an output terminal in which a signal is transferred from the ECU to the regulator of the alternator, as it occurs a difference in the output voltage from the alternator according to the duty rate of the C terminal, the duty of the C terminal is modified to adjust the output voltage from the alternator 1. In addition, the FR terminal is a terminal to which a signal transferred from the regulator to the ECU is outputted.

The charging state defect determination step (S130) determines whether charging is being normally charged from the alternator 1, using the driving time of the engine, a duty rate of alternator 1, the output voltage and the current accumulation value from the alternator 1.

For this purpose, the charging state defect determination step (S130) may include an engine driving time comparison step (S131) which compares whether the engine driving time is greater than the predetermined defect determination engine driving time, an alternator duty comparison step (S132) which determines whether the duties of the C terminal of the alternator and the FR terminal of the alternator exist within the predetermined defect determination duty range when the engine driving time is greater than the defect determination engine driving time, a voltage difference comparison step (S133) which determines whether the difference between the target output voltage from the alternator 1 and the actual output voltage outputted from the alternator 1 is greater than the predetermined diagnostic trouble determination voltage difference when the duties of the C terminal of the alternator and the FR terminal of the alternator do not exist within the predetermined defect determination duty range, and a cumulative amount of current comparison step (S134) which compares whether the cumulative amount of current outputted from the alternator 1 is smaller than the predetermined diagnostic trouble determination current accumulation value.

The engine driving time comparison step (S131) compares whether an operating time after the engine is started is larger than the predetermined diagnostic trouble determination engine driving time. Immediately after the engine is started, since the generation of the alternator is limited in an initial staring state of the engine to improve start-up performance of the vehicle, after a certain period time following the starting of the engine is lapsed, that is, after diagnostic trouble determination engine driving time is lapsed, it is determined whether a charge state is defective. Here, the diagnostic trouble determination engine driving time is preferably set to the 1200 sec.

In the alternator duty comparison step (S132), it is determined whether the duties of the C terminal of the alternator and the FR terminal of the alternator 1 exist in the predetermined diagnostic trouble determination duty range. The alternator duty comparison step (S132) is performed when the engine driving time is larger than the diagnostic trouble determination engine driving time. Here, the diagnostic trouble determination duty range may be set to excess of 90% in the C terminal, to less than 50% in the FR terminal. That is, the charging state from the alternator 1 may defect when the average duty of the C terminal is more than 90% or the FR terminal is not more than 50% in the alternator 1.

The voltage difference comparison step (S133) determines, when the duties of the C terminal of the alternator and the FR terminal of the alternator exist in the diagnostic trouble determination duty range, whether the average value of the difference ($\Delta V$) between a target output voltage from the alternator 1 and actual output voltage is greater than the predetermined diagnostic trouble determination voltage difference. For example, the diagnostic trouble determination voltage difference may be set to 0.5V, when the average value of the voltage difference ($\Delta V$) between a target output voltage from the alternator 1 and actual output voltage is greater than 0.5V, it may determine that the charging from the alternator is defective. That is, when the voltage outputted from the alternator 1 is not a target output voltage, it may determine that the charging state from the alternator 1 is defective.

In the cumulative amount of current comparison step (S134), the cumulative amount of current outputted from the alternator 1 is compared to the predetermined diagnostic trouble determination current accumulation value. The cumulative amount of current comparison step (S134) is performed when the difference between a target output voltage from the alternator 1 and an actual output voltage is greater than the diagnostic trouble code voltage difference in the voltage difference comparison step (S133). In the cumulative amount of current comparison step (S134), when the cumulative amount of current outputted from the alternator 1 is smaller than the predetermined diagnostic trouble determination current accumulation value, the charging state from the alternator 1 is determined to be defective. Here, the diagnostic trouble determination current accumulation value may be set to −5 Ah.

Thus, in the charging state defect determination step (S130), if the state being charged form the alternator 1 is determined as a defect, the described below diagnostic trouble code store step (S140) is performed. That is, the diagnostic trouble code store step (S140) is performed in the following cases: the engine driving time is greater than the diagnostic trouble determination engine driving time, the duties of the C terminal of the alternator and the FR terminal of the alternator exist in the diagnostic trouble determination duty range, when the voltage difference ($\Delta V$) between a target output voltage from the alternator 1 and a actual output voltage from the alternator 1 is greater than the diagnostic trouble determination voltage difference and the cumulative of the current outputted from the alternator 1 is smaller than the predetermined diagnostic trouble determination current accumulation value.

If, among the above four conditions for determining that a charging state is defective, the duties of the C terminal of the alternator 1 and the FR terminal of the alternator 1 do not exist in the diagnostic trouble determination duty range, or the voltage difference ($\Delta V$) between a target output voltage from the alternator 1 and a actual output voltage is not greater than the diagnostic trouble determination voltage difference or the cumulative amount of current outputted from the alternator 1 is not smaller than the predetermined diagnostic trouble determination current accumulation value, the next proceedings are terminated without further.

Meanwhile, when the engine driving time is not greater than the diagnostic trouble determination engine driving time, the process returns to the charging state detection step (S120).

The diagnostic trouble code store step (S140) stores a diagnostic trouble code (DTC; Diagnostic Trouble Code) in the ECU in which the charging state from the alternator 1 is defective when it is determined that a charging state is defective in the charging state defect determination step (S130). The diagnostic trouble code due to the charging defect from the alternator 1 can be easily recognized the charging defect state from the alternator 1 such as a scanner, by assigning and storing a separate diagnostic trouble code in the ECU.

Meanwhile, referring for the diagnostic trouble code release step (S200) is as follows. The diagnostic trouble code release step (S200) may include a diagnostic trouble code release entry determination step (S210) which determines whether the running state of the vehicle and the diagnostic trouble code recorded in the ECU satisfy the conditions to release the diagnostic trouble code concerning charging defect from the alternator, a current accumulation initiation step (S220) which starts to accumulate amount of current outputted from the alternator 1, a charging state good determination step (S230) which determines whether the charging state from the alternator is good by comparing the accumulation time of amount of current and the cumulative amount of current with a predetermined conditions, and a diagnostic trouble code deletion step (S240) which deletes the diagnostic trouble code recorded in the ECU, when it is determined that the charging state from the alternator 1 is good.

By performing the diagnostic trouble code release step (S200), when the charging state from the alternator 1 is changed from defect to normal, the diagnostic trouble code stored in the ECU is to be deleted The diagnostic trouble code release entry determination step (S210) determines whether a running state of the vehicle and the diagnostic trouble code stored in the ECU concerns the charging defect state from the alternator 1. For this purpose, the diagnostic trouble code release entry determination step (S210) may include a diagnosis trouble release vehicle condition satisfaction determination step (S211) which determines whether a running vehicle meets the conditions which can release diagnostic trouble code and a diagnostic trouble code comparison step (S212) which compares whether the diagnostic trouble code stored in the ECU is a diagnostic trouble code on the charging defect from the alternator 1.

The diagnostic trouble release vehicle condition satisfaction determination step (S211) determines whether the running vehicle state satisfies the vehicle conditions for the diagnostic trouble release. The vehicle conditions which check in the diagnostic trouble release vehicle condition satisfaction step (S211) is whether an engine is driving and LIN communication is normal. That is, when the engine is driving and LIN communication is normal, it can be determined that a vehicle conditions for the diagnostic trouble release is satisfied.

Meanwhile, in the diagnostic trouble diagnosis vehicle condition satisfaction determination step (S111), the total running distance of the vehicle is considered. However, in the diagnostic trouble release vehicle condition satisfaction determination step (S211), the total running distance of the vehicle is not considered.

The diagnostic trouble code comparison step (S212) is the step which identifies whether the diagnostic trouble code concerning the charging defect from the alternator 1 is stored. Since the diagnostic trouble code release step (S200) is to delete diagnostic trouble code stored in the ECU, in the diagnostic trouble code comparison step (S212), it confirms whether the diagnostic trouble code concerns the charging defect from the alternator 1 in the ECU.

The current accumulation initiation step (S220) begins to accumulate the amount of current of the power outputted from the alternator 1. The reason of accumulating the amount of current from the alternator 1 through the current accumulation initiation step (S220) is one factor for determining the charging state from the alternator 1.

The charging state good determination step (S230) determines whether the charging state from the alternator 1 is normal, by comparing such as an amount of current accumulation time, the cumulative amount of current with the predetermined conditions. The charging state good determination step (S230) may include a current accumulation time satisfaction determination step (S231) which compares whether the cumulative time of amount of current outputted from the alternator 1 is greater than the predetermined diagnostic trouble release accumulation time, a cumulative amount of current satisfaction determination step (S232) which compares whether the cumulative amount of current outputted from the alternator 1 is greater than the predetermined diagnosis trouble release cumulative amount of current.

The current accumulation time satisfaction determination step (S231) which compares whether the accumulation time of amount of current outputted from the alternator is greater than a predetermined diagnostic trouble release accumulation time. For example, the diagnostic trouble release accumulation time may be set to 600 sec and it is determined whether the accumulation time of amount of current is more than 600 sec. In the current accumulation time satisfaction determination step (S231), the reason to check the time at which the cumulative current is intended to improve the reliability of the electric power accumulation data, by evaluating cumulative amount of the electric power during a certain time, that is, more than the diagnostic trouble release accumulation time.

In the cumulative amount of current satisfaction determination step (S232), when the current accumulation time is greater than the diagnostic trouble release accumulation time, it is compared whether the accumulation value of the current outputted from the alternator 1 is greater than the predetermined diagnostic trouble release cumulative amount of current. When the cumulative amount of current from the alternator 1 is greater than the diagnostic trouble release cumulative amount of current, the diagnostic trouble code deletion step (S240) described below is performed. Here, the diagnostic trouble release cumulative amount of current may be set to 2 Ah.

Meanwhile, in the current accumulation time satisfaction determination step (S231), when an accumulation time of amount of current is not greater than the predetermined diagnostic trouble code release accumulation time, it is returned to the current accumulation initiation step (S220), and when the cumulative amount of current outputted from the alternator 1 is not greater than the predetermined diagnostic trouble release cumulative amount of current, the proceedings are terminated without further.

Figure 3:
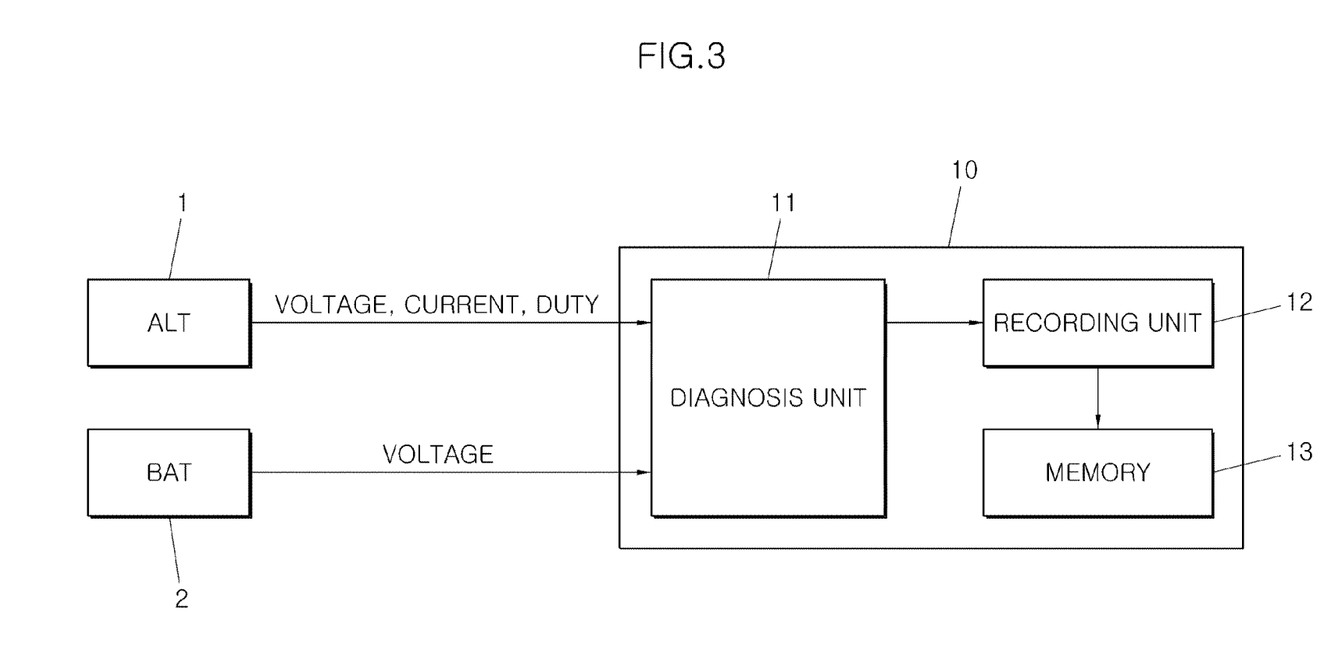
FIG. 3 is a block diagram illustrating of a system for diagnosing charging state in accordance with the exemplary embodiment of the present invention.

In the diagnostic trouble code deletion step (S240), the diagnostic trouble code generated in the ECU concerning the charging defect from the alternator 1 is deleted through the diagnostic trouble code generation step (S100). Through the diagnostic trouble code deletion step (S240), finally by deleting the diagnostic trouble code which is stored in the ECU concerning charging defect from the alternator 1, when the information of a vehicle are checked via a scanner, etc. the information concerning the diagnostic trouble of the alternator 1 should not be outputted A system for diagnosing charging state to perform the method for diagnosing charging state is shown in FIG. 3.

The system for diagnosing charging state 10 in accordance with the exemplary embodiment of the present invention may include a charging state diagnosis unit 11 which diagnoses whether a charging state is diagnostic trouble or not, by diagnosing the voltage, the current, the duty inputted from an alternator which generates and is provided in a vehicle as operated by the driving of an engine and the voltage inputted from a battery charged by the alternator 1 using the above diagnosis method for charging state, a diagnostic trouble code recording unit 12 which generates diagnostic trouble or absence of the charging state as the diagnostic trouble code and records the diagnostic trouble code in the charging state diagnosis unit 11, a diagnostic trouble code memory 13 that stores the diagnostic trouble code generated from the diagnostic trouble code recording unit 12.

The charging state diagnosis unit 11 which diagnoses whether a charging state is defective or not according to the state of electric power inputted from the alternator 1 which is operated by the power of the engine in the vehicle and generates and inputted from the battery 2 into which the electric power generated from the alternator 1 is charged.

The voltage, the current and the duty are inputted into the charging state diagnosis unit 11 from each terminal of the alternator 1, and the voltage and the current are inputted from the battery 2. The charging state diagnosis unit determines whether the charging state is defective or returned to be normal using the above the charging state diagnosis method, by receiving the voltage, the current and the duty from the alternator 1 and receiving the voltage and the current from the battery 2.

The diagnostic trouble code recording unit 12 records or deletes the diagnostic trouble code, comparing with the charging state that is stored in advance when the charge state is determined to the normal or the defect from the charging state diagnosis unit 11. The diagnostic trouble code recording unit 12 generates the diagnosis trouble code and stores it in a diagnostic trouble code memory 13 described below, when the charging state is determined as a defect from the charging state diagnosis unit 11. If it is determined that the charging state is normal from the charging state diagnosis unit 11, the diagnostic trouble code recording unit 12 determines when the check whether the diagnostic trouble code is recorded in the diagnostic trouble code memory 13 and then deletes the diagnostic trouble code, if recorded.

When the diagnostic trouble generated from the diagnostic trouble code recording unit 12 is recorded by the diagnostic trouble code recording unit 12, the diagnostic trouble code memory 13 stores the diagnostic trouble code. The diagnostic trouble code in the diagnostic trouble code memory 13 is outputted by a scanner, it is determined whether the charging state is defective during the maintenance. In addition, the diagnostic trouble code stored in the diagnostic trouble code memory 13 is deleted when the charging state defect is solved, that is, when the charging state is returned to be normal.

Meanwhile, the charging state diagnosis unit 11, the diagnostic trouble code recording unit 12 and the diagnostic trouble code memory 13 configured to form the charging state diagnosis system in accordance the exemplary embodiment of the present invention is stored in the ECU, and performs the above described charging state diagnosis method.

While the present invention has been described with respect to the specific embodiments, it will be apparent to those skilled in the art that various changes and modifications may be made without departing from the spirit and scope of the invention as defined in the following claims.

While the present invention has been described with respect to the specific embodiments, it will be apparent to those skilled in the art that various changes and modifications may be made without departing from the spirit and scope of the invention as defined in the following claims.

What is claimed is:
1. A method for diagnosing charging state comprising:
a diagnostic trouble code generation step of generating a diagnostic trouble code (DTC) when the state for charging a battery from an alternator is abnormal in the state in which the alternator is operating to charge the battery while a vehicle is traveling, and then storing diagnostic trouble code in an ECU (Electronic Control Unit), wherein the vehicle is a vehicle having an internal combustion engine; and
a diagnostic trouble code release step of deleting the diagnostic trouble code in the ECU when the state for charging the battery from the alternator is returned to be normal, wherein
the diagnostic trouble code generation step comprises:

a diagnostic trouble code generation entry determination step of determining whether the conditions for generating diagnostic trouble code are satisfied by determining the states of the vehicle and the battery;
a charging state detection step of detecting the state charged to the battery from the alternator;
a charging state defect determination step of determining whether the charging state from the alternator is defective, by comparing an engine driving time, an operating conditions of the alternator, a difference between a target voltage and an output voltage and a current accumulation with each predetermined conditions; and
a diagnostic trouble code store step of generating the diagnostic trouble code with the state that the battery is not charged due to a charging state defect from the alternator and storing the diagnostic trouble code in the ECU, and
the charging state detection step calculated a cumulative amount of current charged from the alternator to the battery, duties of a C terminal of the alternator and a FR terminal of the alternator and an average voltage of the battery.

2. The method for diagnosing charging state of claim 1, wherein the diagnostic trouble code release step comprises:
a diagnostic trouble code release entry determination step of determining whether the running state of the vehicle and the diagnostic trouble code recorded in the ECU satisfy the conditions to release the diagnostic trouble code concerning the charging defect from the alternator;
a current accumulation initiation step of starting to accumulate the amount of the current outputted from the alternator;
a charging state good determination step of determining whether the charging state from the alternator is good by comparing the accumulation time of the amount of the current and the cumulative amount of the current with predetermined conditions; and
a diagnostic trouble code deletion step of deleting the diagnostic trouble code recorded in the ECU, when it is determined that the charging state from the alternator is good.

3. The method for diagnosing charging state of claim 1, wherein the diagnostic trouble code generation entry determination step comprises:
a diagnostic trouble diagnosis vehicle condition satisfaction determination step of determining whether a running vehicle satisfies the conditions which can generate the diagnostic trouble code based on the charging defect from the alternator; and
a battery state determination step of determining whether the charging rate of the battery is lower than a predetermined diagnostic trouble diagnosis entry charging rate.

4. The method for diagnosing charging state of claim 3, wherein in the diagnostic trouble diagnosis vehicle condition satisfaction determination step, the battery state determination step is performed when the engine is driving, LIN (Local Interconnect Network) communication is normal and a total running distance of the vehicle is less than a predetermined diagnostic trouble code generation total running distance.

5. The method for diagnosing charging state of claim 3, wherein in the battery state determination step, the charging state detection step is performed when the charging rate of the battery is lower than a predetermined diagnostic trouble diagnosis entry charging rate.

6. The method for diagnosing charging state of claim 2, wherein the charging state good determination step comprises;
- a current accumulation time satisfaction determination step of comparing whether the accumulation time of the amount of the current outputted from the alternator is greater than a predetermined diagnostic trouble release accumulation time; and
- a cumulative amount of current satisfaction determination step of comparing whether the cumulative amount of the current outputted from the alternator is greater than a predetermined diagnostic trouble release cumulative amount of the current.

7. The method for diagnosing charging state of claim 1, wherein the charging state defect determination step comprises:
- an engine driving time comparison step of comparing whether the engine driving time is greater than a predetermined defect determination engine driving time;
- an alternator duty comparison step of determining whether the duties of the C terminal of the alternator and the FR terminal of the alternator exist within a predetermined defect determination duty range;
- a voltage difference comparison step of determining whether the difference between a target output voltage of the alternator and an actual output voltage outputted from the alternator is greater than a predetermined diagnostic trouble determination voltage difference; and
- a cumulative amount of current comparison step of comparing whether the cumulative amount of current outputted from the alternator is smaller than a predetermined diagnostic trouble determination current accumulation value.

8. The method for diagnosing charging state of claim 7, wherein the defect determination engine driving time is set to 1200 sec in the engine driving time comparison step.

9. The method for diagnosing charging state of claim 8, wherein it is returned to the charging state detection step when the engine driving time is not greater than the defect determination engine driving time.

10. The method for diagnosing charging state of claim 7, wherein the defect determination duty rage is set to that the duty of the C terminal of the alternator is excess 90% and the duty of the FR terminal of the alternator is less than 50% in the alternator duty comparison step.

11. The method for diagnosing charging state of claim 7, wherein the diagnostic trouble determination voltage difference is set to 0.5V in the voltage difference comparison step.

12. The method for diagnosing charging state of claim 7, wherein the diagnostic trouble determination current accumulation value is set to −5 Ah in the cumulative amount of current comparison step.

13. The method for diagnosing charging state of claim 2, wherein the diagnostic trouble code release entry determination step comprises:
- a diagnostic trouble release vehicle condition satisfaction determination step of determining whether the running state of the vehicle satisfies the conditions that can release the diagnostic trouble code; and
- a diagnostic trouble code comparison step of comparing whether the diagnostic trouble code stored in the ECU is the diagnostic trouble code concerning the charging defect from the alternator;
- wherein the current accumulation initiation step is performed when the diagnostic trouble code is the diagnostic trouble code regarding the charging defect from the alternator in the diagnostic trouble code comparison step.

14. The method for diagnosing charging state of claim 6, wherein in the cumulative amount of the current satisfaction determination step, the diagnostic trouble release cumulative amount of the current is set to 2 Ah.

15. The method for diagnosing charging state of claim 13, wherein in the diagnostic trouble release vehicle condition satisfaction determination step, the diagnostic trouble code comparison step is performed when the engine is driving and the LIN (Local Interconnect Network) communication is normal.

16. The method for diagnosing charging state of claim 6, wherein in the current accumulation time satisfaction determination step, the diagnostic trouble release accumulation time is set to 600 sec.

* * * * *